(12) United States Patent
Borgen et al.

(10) Patent No.: US 8,698,336 B2
(45) Date of Patent: Apr. 15, 2014

(54) WIND TURBINE ROTOR AND WIND TURBINE

(75) Inventors: Eystein Borgen, Rådal (NO); William Carron, Rådal (NO); Mark West, Hjellestad (NO)

(73) Assignee: Sway Turbine AS, Rådål (NO)

( * ) Notice: Subject to any disclaimer, the term of this patent is extended or adjusted under 35 U.S.C. 154(b) by 0 days.

(21) Appl. No.: 13/639,677

(22) PCT Filed: Apr. 8, 2011

(86) PCT No.: PCT/EP2011/055554
§ 371 (c)(1),
(2), (4) Date: Jan. 21, 2013

(87) PCT Pub. No.: WO2011/124707
PCT Pub. Date: Oct. 13, 2011

(65) Prior Publication Data
US 2013/0115068 A1    May 9, 2013

(30) Foreign Application Priority Data

Apr. 9, 2010 (GB) .................................. 1005917.8
Apr. 9, 2010 (GB) .................................. 1005942.6

(51) Int. Cl.
*F03D 9/00* (2006.01)
(52) U.S. Cl.
USPC .............................................. 290/44; 290/55
(58) Field of Classification Search
USPC ..................................................... 290/44, 55
See application file for complete search history.

(56) References Cited

U.S. PATENT DOCUMENTS

| 4,330,714 | A | 5/1982 | Smith |
| 4,350,895 | A | 9/1982 | Cook |
| 7,042,109 | B2 * | 5/2006 | Gabrys ........................... 290/44 |
| 2006/0251516 | A1 * | 11/2006 | Sohn ........................ 416/132 B |
| 2008/0292467 | A1 * | 11/2008 | Borgen ..................... 416/244 R |

FOREIGN PATENT DOCUMENTS

EP    1394406 A2    3/2004
(Continued)

OTHER PUBLICATIONS

International Search Report for PCT/EP2011/055554 dated Apr. 12, 2012, consists of 6 unnumbered pages.
(Continued)

*Primary Examiner* — Tho D Ta

(57) ABSTRACT

A wind turbine comprising: a shaft (2); a plurality of blade arrangements (8), each of which is rotatable around the shaft and has a blade (7), said blade arrangements and blades forming a blade rotor which is rotatable around the shaft; at least first and second bearing arrangements (6) spaced axially along the shaft, said blade rotor being connected to said first and second bearing arrangements; and a direct drive generator comprising a stator (10), which is rotationally fixed to the shaft, and a generator rotor (9) having a rim; wherein the first and second bearing arrangements each transmit radial forces from the blade rotor to the shaft, and at least one of the first and second bearing arrangements transmits bending moments to the shaft, each of the blade arrangements being connected to a point at or adjacent the rim of the generator rotor so as to transmit torque generated by the blade arrangement directly thereto, and wherein the generator rotor (9) is within the blade rotor.

20 Claims, 8 Drawing Sheets

(56) References Cited

FOREIGN PATENT DOCUMENTS

| | | |
|---|---|---|
| EP | 1657437 A1 | 5/2006 |
| EP | 1783363 A1 | 5/2007 |
| EP | 2147209 A1 | 1/2010 |
| GB | 1511948 A | 5/1978 |
| WO | WO-86/02701 A | 5/1986 |
| WO | WO-97/13979 A1 | 4/1997 |
| WO | WO-2007/135391 A2 | 11/2007 |
| WO | WO-2008/127114 A1 | 10/2008 |
| WO | WO-2010/040829 A1 | 4/2010 |

OTHER PUBLICATIONS

GB Search Report for GB1005942.6, Sep. 9, 2010, consists of 2 unnumbered pages.
GB Search Report for GB1005917.8, Sep. 9, 2010, consists of 2 pages.

* cited by examiner

WIND TURBINE ROTOR AND WIND TURBINE

The present invention relates to a wind turbine rotor and to a wind turbine including such a rotor.

Wind turbines for generating electricity are known and are being deployed in increasing numbers to provide a sustainable electricity supply. The maximum power which a wind turbine can generate is proportional to the swept area of its blades, which swept area is approximately proportional to the square of the lengths of the blades. There is a desire to increase the size of wind turbines so as to increase the maximum power which they are capable of providing and so as to reduce the cost of the supplied energy. However, linear scaling of output power cannot be achieved simply by linearly scaling the wind turbine components.

For example, if the length of each blade is doubled, the swept area is increased four-fold. However, the weight of each blade is generally proportional to the cube of the length so that the weight is increased eight-fold.

Wind turbines are known in which blades are fixed to a hub which drives a generator via a shaft connected to that hub. Examples of this arrangement are disclosed in WO 03/098034A1, DE 10311025A1, US 2006/0251516A1, EP 0058791A1 and U.S. Pat. No. 6,951,443 B1.

Generators driven by axles have typically required the use of a gearbox to increase the rotary speed so as to provide more efficient generation of electricity. However, gearboxes are inconvenient in that they add to the cost, weight and servicing requirements of wind turbines. Direct drive generators have been used and examples of such arrangements are disclosed in DE 10255745A1 and U.S. Pat. No. 6,285,090 B1.

WO 02/099950A1 discloses an electrical generator of this type. The wind turbine comprises a rotor whose rim is connected to a hub by tension members so as to resemble a spoked bicycle wheel. The hub is driven by an axially spaced wind turbine blade arrangement.

CA26265452A1 discloses a wind turbine with a direct drive generator. The blades of the turbine rotor are fixed to an annulus, which is connected to a hub by rods extending radially from the hub and disposed in a common plane perpendicular to the axis of rotation. The blade forces are resolved at the annulus, to which the inner ends of the blades are connected. The annulus must therefore be fabricated with sufficient strength to withstand these forces. For an annulus having a radius about the axis of rotation of the order of 12 meters and a cross-sectional diameter of the order of 3.5 meters, manufacture is relatively expensive and the annulus is of considerable weight. Transportation and assembly of the wind turbine therefore tend to be expensive.

U.S. Pat. No. 7,042,109 B2 discloses various arrangements of wind turbines in which a turbine rotor drives an ironless ring-type generator directly or through a gearbox. In the arrangement shown in FIG. 3 of this document, the blades extend within a rotor hub to the hub bearings and a generator rotor is fixed to the hub. Components parallel to the axis of rotation of forces acting on the blades are communicated to the bearings and also to the generator rotor. Torque produced by the blades is transmitted to the generator rotor.

Wind turbines with the blades fixed to a hub and braced by a rope or cable arrangement are also known. In such turbines, the hub again drives a generator via an axle and typically via a gearbox. Wind turbines of this type are not suitable for relatively high power generation as the swept area cannot be increased sufficiently while maintaining the integrity of structure.

Other examples of wind turbines are disclosed in GB 1511948A1, WO 97/13979A1, U.S. Pat. No. 4,330,714 A, U.S. Pat. No. 4,350,895 A, WO 86/02701A1, WO 2007/135391A2, US 2005/200134A1, U.S. Pat. No. 5,118,255 A, U.S. Pat. No. 2,050,129 A, DE 19606359A1 and US 2008/124216A1.

Initial aspects of the invention may be defined by the following numbered paragraphs:

1. A wind turbine comprising: a shaft; a plurality of blade arrangements, each of which is rotatable around the shaft and has a blade whose radially outer end is unsupported: at least first and second bearing arrangements spaced axially along the shaft; and a direct drive generator comprising a stator, which is rotationally fixed to the shaft, and a rotor having a rim connected to the first and second bearing arrangements, each of which transmits radial forces from the rotor to the shaft and at least one of which transmits bending moments to the shaft, each of the blade arrangements being connected to a point at or adjacent the rim so as to transmit torque generated by the blade arrangement directly thereto, each of the blade arrangements having first and second legs which straddle the generator.

2. A turbine as defined in paragraph 1, in which the stator is disposed between the first and second bearing arrangements.

3. A turbine as defined in paragraph 1 or 2, in which each blade is connected to the rest of the blade arrangement by a pitch bearing.

4. A turbine as defined in any one of the preceding paragraphs, in which the rim is connected to the first and second bearing arrangement by a plurality of pairs of third and fourth legs, respectively, with the third and fourth legs of each pair being disposed in a plane containing or parallel to the axis of the shaft.

5. A turbine as defined in an one of the preceding paragraphs, in which each of the blade arrangements is connected to the point by a link which is flexible and/or pivoted to the blade arrangement and/or the point.

6. A turbine as defined in any one of the preceding paragraphs, in which each of the first and second bearing arrangements transmits bending moments to the shaft.

7. A turbine as defined in any one of the preceding paragraphs, in which the first and second legs are connected to the first and second bearing arrangements, respectively.

8. A wind turbine comprising: a shaft; a turbine rotor having at least two bearing arrangements spaced axially along the shaft for permitting rotation of the turbine rotor with respect to the shaft about an axis, and a plurality of blade arrangements arranged to communicate to at least one of the bearing arrangements at least some of the resultant force of components, acting parallel to the axis, of all forces acting on the blade arrangements; and a direct drive generator having a generator stator and a generator rotor, the generator rotor at least partially maintaining the angular relationships of the blade arrangements and being separate from the blade arrangements, each blade arrangement being arranged to communicate torque from the blade arrangement acting about the axis substantially exclusively to the generator rotor.

9. A turbine as defined in paragraph 8, in which the blade arrangements have blades which are unsupported at their radially outer ends.

10. A turbine as defined in paragraph 8 or 9, in which each blade arrangement is arranged to communicate to at least one of the bearing arrangements at least half of the resultant force.

11. A turbine as defined in paragraph 10, in which each blade arrangement is arranged to communicate to at least one of the bearing arrangements at least 90% of the resultant force.

12. A turbine as defined in any one of paragraphs 8 to 11, in which the at least one bearing arrangement is arranged to transfer bending moments to the shaft.

13. A turbine as defined in paragraph 12, in which the or each bearing arrangement comprises a plurality of plane or rolling element bearings whose outer races are rigidly connected to a pipe.

14. A turbine as defined in any one of paragraphs 8 to 13, in which the turbine rotor comprises a multi-legged structure with radially inner leg ends being attached to the first and second bearing members.

15. A turbine as defined in any one of paragraphs 8 to 14, in which the blade arrangements include a first open frame structure.

16. A turbine as defined in paragraph 15, in which the first open frame structure comprises a first space frame.

17. A turbine as defined in any one of paragraphs 8 to 16, in which the generator rotor is connected to the at least one bearing arrangement by a second open frame structure.

18. A turbine as defined in paragraph 17 when dependent on paragraph 16, in which the second open frame structure is mechanically substantially independent of the first open frame structure.

19. A turbine as defined in paragraph 17 or 18, in which the second open frame structure comprises at least one second space frame.

20. A turbine as defined in any one of paragraphs 8 to 19, in which the radial distance from the axis to the radially innermost end of each blade of each blade arrangement is greater than the radial distance from the axis to the generator rotor.

21. A turbine as defined in any one of paragraphs 8 to 20, in which the blade arrangements are spaced equi-angularly around the axis.

22. A turbine as defined in paragraph 21, in which the blades of the blade arrangements are disposed in a first plane which is perpendicular to the axis or in a frusto-conical surface which is coaxial with the axis.

23. A turbine as defined in paragraph 21 or 22, in which the blade arrangements are separate from each other.

24. A turbine as defined in any one of paragraphs 8 to 23, in which each blade arrangement is connected to the generator rotor by a first member for transmitting torque about the axis from the blade arrangement to the generator rotor.

25. A turbine as defined in paragraph 24, in which the first member is resilient, and/or is articulated to the blade mounting arrangement and the generator rotor, so as to reduce or prevent the communication of components, acting parallel to the axis, of all forces acting on the blade arrangement to the generator rotor.

26. A turbine as defined in paragraph 24 or 25, in which each first member is connected to a plate which is disposed between the blade and the rest of the blade arrangement and to which the blade is attached.

27. A turbine as defined in paragraph 26, in which each blade is mounted to the plate via a pitch bearing.

28. A turbine as defined in any one of paragraphs 8 to 27, in which each blade arrangement comprises second and third members disposed in a second plane containing the axis and having first ends connected together and to the blade and second ends connected to the at least one bearing member at respective positions which are spaced apart parallel to the axis.

29. A turbine as defined in paragraph 28, in which each blade has a centre of force for all force components acting parallel to the axis and the second and third members extend in lines which substantially intersect each other at or adjacent the centre of force.

30. A turbine as defined in paragraph 28 or 29, in which the second and third members of each blade arrangement comprise first and second portions of a composite member.

31. A turbine as defined in any one of paragraphs 8 to 30, in which each blade arrangement comprises first and second attachment points attached to the at least one bearing arrangement and a third attachment point attached or connected to the generator rotor.

32. A turbine as defined in paragraph 31, in which the blade arrangement has resilience at or adjacent the third attachment point for reducing or preventing the communication of components, acting parallel to the axis, of all forces acting on the blade arrangement to the generator rotor.

33. A turbine as defined in any one of the paragraphs 8 to 32, in which the generator rotor is connected to the bearing arrangements by a plurality of pairs of fourth and fifth members disposed in respective third planes containing the axis and having first ends connected together and to the generator rotor and second ends connected to the bearing arrangements at respective positions which are spaced apart parallel to the axis.

34. A turbine as defined in any one of paragraphs 24 to 30 and 32 to 33, in which each member is substantially rigid and/or in tension.

35. A turbine as defined in any one of paragraphs 8 to 30 and 32 and 34, in which each of the members is substantially straight, or has a substantially straight portion, between the first and second ends thereof.

36. A turbine as defined in any one of paragraphs 8 to 35, in which the generator stator is fixed to the shaft and is disposed between the bearing arrangements.

37. A turbine as defined in paragraph 36 when dependent on any one of paragraphs 28 to 30 and 33 to 35, in which first and second of the bearing arrangements are connected to the second ends of the second and third members, respectively, and/or the second ends of the fourth and fifth members, respectively.

38. A turbine as defined in any one of paragraphs 8 to 37, in which the generator rotor comprises a plurality of permanent magnets or coils angularly spaced around the axis.

39. A turbine as defined in paragraph 38, in which the generator rotor comprises first and second coaxial annular yokes which face each other across a magnetic air gap for the generator stator.

40. A turbine as defined in paragraph 39 when dependently directly or indirectly on paragraph 34, in which the first ends of the fourth and fifth members are fixed to the first and second yokes.

41. A turbine as defined in paragraph 39 or 40, in which the first and second yokes are ferromagnetic.

42. A turbine as defined in any one of paragraphs 39 to 41, in which the permanent magnets are fixed to backing plates which are detachably attached to facing surfaces of the first and second yokes to define the air gap.

43. A turbine as defined in any one of the preceding paragraphs, in which the generator is an ironless core generator.

Further aspects of the invention may be defined by the following statements of invention.

1. A wind turbine rotor comprising at least one bearing member for permitting rotation of the rotor with respect to a shaft about an axis, a generator drive arrangement and a plurality of turbine blades and blade mounting arrangements, the blades being unsupported at their radially outer ends, each blade mounting arrangement being arranged to communicate components, acting parallel to the axis, of all forces acting on the associated blade substantially exclusively to the at least one bearing member and to communicate torque acting about the axis on the associated blade substantially exclusively to the generator drive arrangement, the generator drive arrangement being connected to but separate from the blades, the blades and the blade mounting arrangements being such that the blades are of fixed pitch.

2. A rotor as defined in paragraph 1, in which the blades are arranged to be stall regulated.

3. A rotor as defined in paragraph 1 or 2, in which each blade mounting arrangement comprises a first open frame structure.

4. A rotor as defined in paragraph 3, in which the first open frame structure comprises a first space frame.

5. A rotor as defined in any one of the preceding paragraphs, in which the generator drive arrangement is connected to the at least one bearing member by a second open frame structure.

6. A rotor as defined in paragraph 5 when dependent on paragraphs 3 or 4, in which the second open frame structure is mechanically substantially independent of the first open frame structure.

7. A rotor as defined in paragraph 5 or 6, in which the second open frame structure comprises at least one second space frame.

8. A rotor as defined in any one of paragraphs 5 to 7 when dependent on paragraph 3 or 4, in which the second open frame structure is disposed inside the first open frame structure.

9. A rotor as defined in any one of the preceding paragraphs, in which the radial distance from the axis to the radially innermost end of each blade is greater than the radial distance from the axis to the generator drive arrangement.

10. A rotor as defined in any one of the preceding paragraphs, in which the turbine blades and blade mounting arrangements are spaced equi-angularly around the axis.

11. A rotor as defined in paragraph 10, in which the turbine blades are disposed in a first plane which is perpendicular to the axis or in a frusto-conical surface which is coaxial with the axis.

12. A rotor as defined in paragraph 10 or 11, in which the blade mounting arrangements are separate from each other.

13. A rotor as defined in any one of the preceding paragraphs, in which each blade mounting arrangement is connected to the generator drive arrangement by a first member for transmitting substantially only torque about the axis from the associated blade to the generator drive arrangement.

14. A rotor as defined in paragraph 13, in which the first member is resilient, and/or is articulated to the blade mounting arrangement and the generator drive arrangement, so as substantially to prevent the communication of components, acting parallel to the axis, of all forces acting on the blade to the generator drive arrangement.

15. A rotor as defined in any one of the preceding paragraphs, in which each blade mounting arrangement comprises second and third members disposed in a second plane containing the axis and having first ends connected together and to the blade and second ends connected to the at least one bearing member at respective positions which are spaced apart parallel to the axis.

16. A rotor as defined in paragraph 15, in which each blade has a centre of force for all force components acting parallel to the axis and the second and third members extend in lines which substantially intersect each other at or adjacent the centre of force.

17. A rotor as defined in paragraph 15 or 16, in which the second and third members of each blade mounting arrangement comprise first and second portions of a composite member.

18. A rotor as defined in any one of the preceding paragraphs, in which each blade mounting arrangement is shaped so as to convert wind into torque about the axis.

19. A rotor as defined in any one of the preceding paragraphs, in which each blade mounting arrangement comprises first and second attachment points attached to the at least one bearing member and a third attachment point attached or connected to the generator drive arrangement.

20. A rotor as defined in paragraph 19, in which the blade mounting arrangement has resilience at or adjacent the third attachment point for substantially preventing the communication of components, acting parallel to the axis, of all forces acting on the blade to the generator drive arrangement.

21. A rotor as defined in any one of the preceding paragraphs, in which the generator drive arrangement is connected to the at least one bearing member by a plurality of pairs of fourth and fifth members disposed in respective third planes containing the axis and having first ends connected together and to the generator drive arrangement and second ends connected to the at least one bearing member at respective positions which are spaced apart parallel to the axis.

22. A rotor as defined in any one of paragraphs 13 to 17 and 20 to 21, in which each member is substantially rigid.

23. A rotor as defined in any one of paragraphs 1 to 17 and 20 and 22, in which each of the members is substantially straight, or has a substantially straight portion, between the first and second ends thereof.

24. A rotor as defined in any one of the preceding paragraphs, in which the at least one bearing member comprises first and second bearing members which are spaced apart axially to accommodate a generator stator.

25. A rotor as defined in paragraph 24, in which the first and second bearing members form part of or cooperate with a thrust bearing arrangement for determining or restricting the axial separation of the first and second bearing members.

26. A rotor as defined in paragraph 24 or 25 when dependent on any one of paragraphs 15 to 17 and 21 to 23, in which the first and second bearing members are connected to the second ends of the second and third members, respectively, and/or the second ends of the fourth and fifth members, respectively.

27. A rotor as defined in any one of the preceding paragraphs, in which the generator drive arrangement is annular and coaxial with the axis.

28. A rotor as defined in any one of the preceding paragraphs, in which the generator drive arrangement is fixed to or forms at least part of a generator rotor.

29. A rotor as defined in paragraph 28, in which the generator rotor comprises a plurality of permanent magnets or coils angularly spaced around the axis.

30. A rotor as defined in paragraph 29 in which the generator rotor comprises first and second coaxial annular yokes which face each other across a magnetic air gap for a or the generator stator.

31. A rotor as defined in paragraph 30 when dependently directly or indirectly on paragraph 17, in which the first ends of the fourth and fifth members are fixed to the first and second yokes.

32. A rotor as defined in paragraph 30 or 31, in which the first and second yokes are ferromagnetic.

33. A rotor as defined in any one of paragraphs 30 to 32, in which the permanent magnets are fixed to backing plates which are detachably attached to facing surfaces of the first and second yokes to define the air gap.

34. A wind turbine rotor comprising a hub for rotation about an axis and at least one turbine blade and blade mounting arrangement, the or each blade having a centre of force for all force components acting parallel to the axis and the or each blade mounting arrangement comprising first and second members which connect the associated blade to the hub, which are connected to the hub at radially inner ends, spaced apart parallel to the axis, and which extend in lines which substantially intersect each other substantially at or adjacent the centre of force, the or each blade and blade mounting arrangement being such that the or each blade is of fixed pitch.

35. A wind turbine comprising a rotor as defined in any one of the preceding paragraphs and a generator.

36. A turbine as defined in paragraph 35 when dependent on any one of paragraphs 1 to 33, in which the generator is arranged to be driven by or includes the drive arrangement.

37. A turbine as defined in paragraph 35 or 36, in which the generator is a direct drive generator.

38. A turbine as defined in any one of paragraphs 35 to 37, in which the generator is an ironless core generator.

39. A turbine as defined in any one of paragraphs 35 to 38 when dependent directly or indirectly on paragraph 24, in which the bearing members are rotatably mounted on a fixed shaft to which the stator is rotationally fixed.

It is thus possible to provide a wind turbine rotor and to make a wind turbine which is capable of generating a relatively large amount of electrical power. Such an arrangement may be made relatively light and may be relatively easy to manufacture, transport and assemble. Such arrangement may also be capable of providing relatively low cost energy, for example in terms of the electrical energy which may be generating throughout the life of a wind turbine compared with manufacturing and running costs.

The invention will be further described, by way of example, with reference to the accompanying drawings, in which.

Like reference numerals refer to like parts throughout the drawings.

Figure 1:
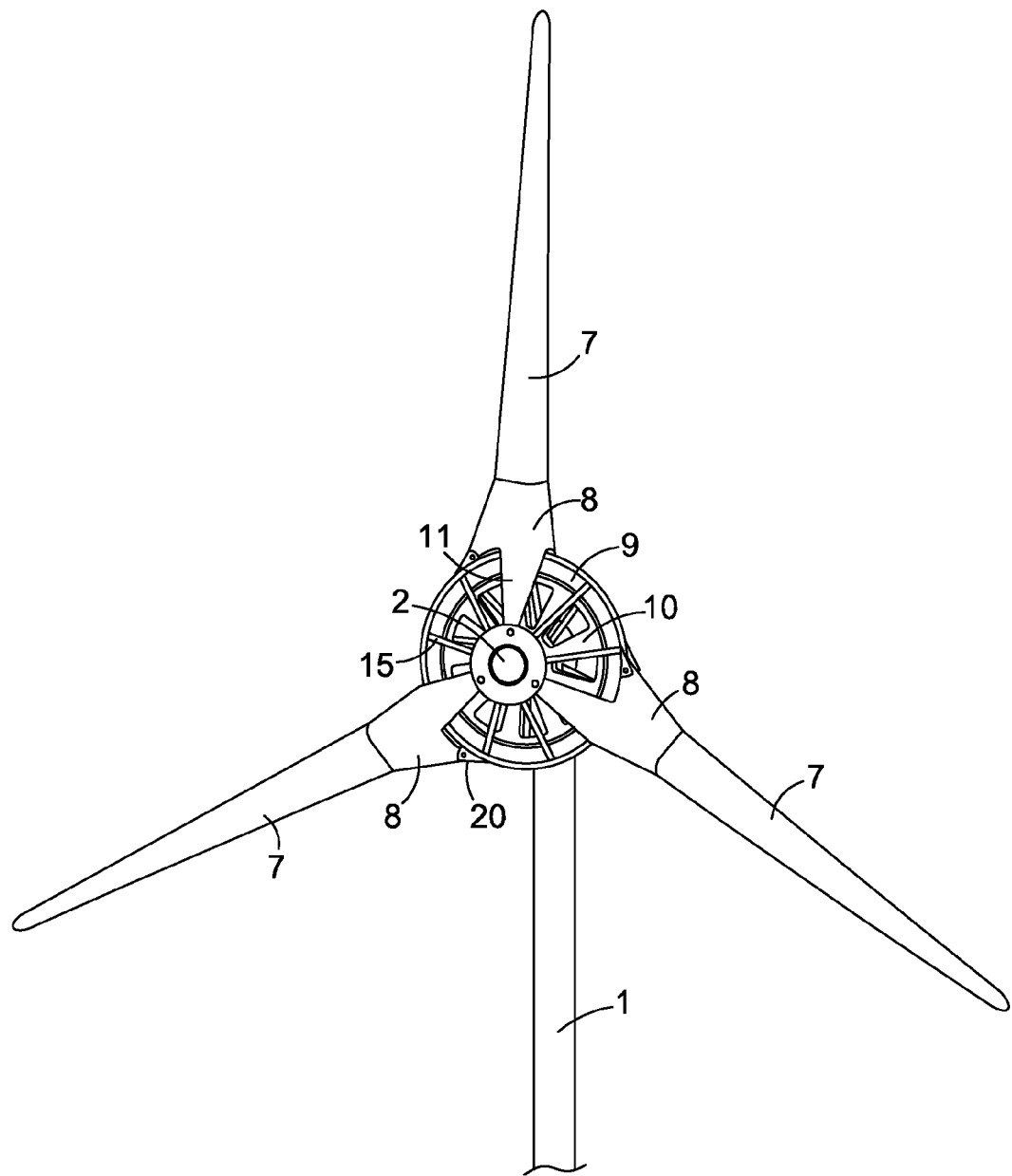
FIG. 1 illustrates a wind turbine constituting an embodiment of the invention.
Figure 2:
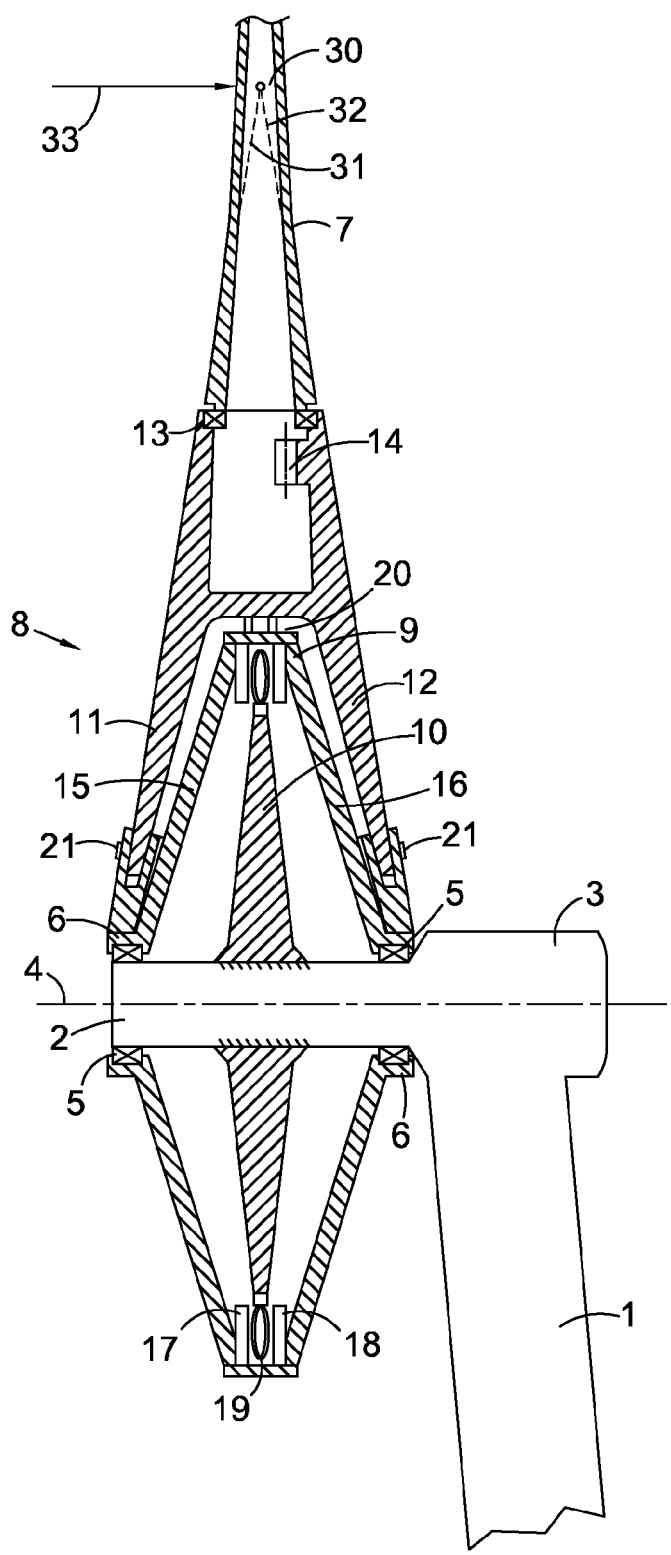
FIG. 2 is a cross-sectional drawing of part of the wind turbine of FIG. 1.

The wind turbine shown in FIGS. 1 and 2 is suitable for use as a high power generator of electricity. For example, in a typical application, such a wind turbine may have a rated output of the order of twelve MegaWatts. The turbine may be deployed on land or offshore wherever favourable wind conditions exist and the presence of one or more such wind turbines is acceptable.

The wind turbine comprises a support tower 1 which may be fixed in the ground by means of a suitable foundation (not shown) for onshore applications or may be provided with buoyancy and/or fixing arrangements for offshore applications. For example, the tower and fixing arrangement may be of the type disclosed in EP1509696 and EP1944504.

A main shaft 2 is fixed to a head 3 of the tower 1 such that an axis 4 of the shaft is maintained substantially horizontal. In order to allow the wind turbine to accommodate different wind directions, the head 3 may be mounted at the top of the tower 1 for pivoting about a vertical axis. The wind turbine comprises a rotor which is rotatably mounted on the shaft 2 for rotation about the axis 4 by means of main bearings 5 including first and second bearing members 6. The rotor comprises the bearing members 6 (constituting a hub), three turbine blades 7 which are arranged equi-angularly around the axis 4, three turbine blade mounting arrangements 8, and a generator drive arrangement in the form of an annular generator rotor 9. A generator stator 10 is fixed to the shaft 2 between the bearing members 6.

Each of the bearing members 6 is of the "moment stiff" type. In particular, the bearing members 6 transfer bending moments on the blade mounting arrangements 8 to the shaft 2. Thus, the bearing members 6 are such that bending moments which might alter the position of the rotor 9 with respect to the stator 10 are transferred to the shaft 2, which resists such displacements.

The bearing members 6 may be of any suitable type. For example, each of the bearing members 6 may comprise one or more bearings, each of which may be a rolling element bearing or a plain bearing and may provide angular contact. Examples of rolling elements which are suitable include spherical elements, cylindrical elements and frusto-conical (tapered) elements. For example, outer bearing races may be rigidly connected to a tube or pipe forming a hub. In a specific example, two rolling element bearings may be disposed at or adjacent one end of the pipe and one rolling element bearing may be disposed at or adjacent the other end of the pipe. The bearings may be disposed inside the pipe.

Although the wind turbines of the embodiments described herein have three turbine blades and mounting arrangements or blade arrangements, any appropriate number may be provided according to the application. The blades 7 are supported exclusively at their radially inner ends or portions and are unsupported at their radially outer ends, for example by a ring structure (although interconnecting cables may be used).

Each mounting arrangement 8 comprises a member which may be formed from composite material or from metal. The arrangement 8 resembles an "A-frame" or space frame and comprises first and second portions 11 and 12 forming first and second members whose inner ends are connected to the bearing members 6 so as to be spaced apart parallel to the axis 4. The inner ends may be rigidly fixed to the bearing members or may be pivotally attached thereto. The outer ends are connected together and to an outer part of the composite member 8 which provides a pivotal mounting for the blade 7 such that the blade 7 may be pivoted about its longitudinal axis so as to permit the degree of feathering or pitch of the blade to be controlled. For example, the outer end of the blade mounting arrangement is provided with a plate which extends substantially perpendicularly to the pitch axis of the blade 7. The plate provides a mounting for the blade, which is connected to the plate by a pitch bearing 13 for permitting the pitch of the blade 7 to vary. A motor 14 rotates the blade 7 to a desired pitch. The outer ends of the members 11 and 12 are connected to the mounting for the blade 7 by virtue of being part of the composite member. The turbine rotor thus comprises a multi-legged structure with radially inner leg ends attached to the bearing members 6.

The generator rotor comprises a plurality of pairs of third and fourth members 15 and 16 arranged to resemble A-frames or space frames. The radially inner ends of the members 15 and 16 are connected to the bearing members 6 so as to be spaced apart axially whereas the radially outer ends of the members 15 and 16 are connected to a generator drive arrangement in the form of the generator rotor 9. The generator rotor 9 is thus connected to but separate from the blades 7. As an alternative, the rotor may be in compression and may be connected to the hub by spokes in tension.

The generator comprising the rotor 9 and the stator 10 is of the ironless, annular or ring, direct drive type. The rotor comprises a pair of coaxial annular members 17 and 18 carrying permanent magnets and defining therebetween a magnetic air gap. The magnets are arranged on the annular members 17 and 18 as facing pairs of magnets such that the magnets of each pair have opposite poles facing each other and the magnet poles alternate around the circumferences, or angularly with respect to the axis 4.

The stator comprises a plurality of angularly distributed coils 19 which are disposed inside the air gap between the members 17 and 18. The coils 19 are of the "ironless" type in that they do not contain a ferromagnetic core. For example, the coils may be formed and encapsulated in a material of sufficient strength, such as an epoxy resin, to maintain the structure and form of the coils. The outputs of the coils are processed in accordance with the specific requirements of the application and the generated electricity is supplied via conductors passing through the tower 1.

The stator may comprise a rim in compression connected to the shaft by spokes in tension.

Generators of this type are known and will not be further described in detail. Similarly, electrical circuit arrangements for processing the outputs of such generators are known and will not be further described. Examples of such generators and arrangements are, for example, disclosed in several of the publications referred to hereinbefore.

Each of the mounting arrangements 8 is connected to the rotor 9 by means of a connection shown at 20. The rotor 9 is thus driven by each blade 7 via its mounting arrangement 8 and the connection 20 so as to rotate about the axis 4 relative to the stator 10. The coils 19 thus cut the magnetic flux between the members 17 and 18 in the air gap to generate electricity.

In use, the blades 7, which are disposed in a common plane perpendicular to the axis 4 of rotation about the shaft 2 or in a frusto-conical surface which is coaxial with the axis 4, are directed into the wind direction and the motors 14 rotate the blades 7 around their longitudinal axes so as to provide the desired blade pitch. For example, the pitch may be set such that the outer tip speed of the blades 7 is approximately equal to six times the wind speed for maximum theoretical efficiency of energy extraction from the wind. Various forces act on the blades 7 and these may be resolved into forces acting on the blades 7 parallel to the axis 4, the weight of the blades and the blade mounting arrangements 8, and torque acting on the blades 7 about the axis 4. The mounting arrangement 8 is such that at least some of the resultant force of the forces acting parallel to the axis 4 (or all components of forces acting parallel to this axis) is communicated, principally by the members 11 and 12 of each composite member 8, to the bearing members 6. Each blade 7 has a centre 30 of force for all force components 33 acting parallel to the axis 4 of rotation. The members 11 and 12 extend in lines 31, 32 which substantially intersect each other at or adjacent the centre 30 of force. Thus, any tendency to movement in the horizontal direction in FIG. 2 is resisted by the bearing members 6 via the members 11 and 12 and is not substantially communicated via the connection 20 to the rotor 9.

It is preferable for a large proportion, for example more than 50% or even more than 90%, of the resultant force to be communicated by the mounting arrangements 8 to the bearing members 6 and hence not to the generator rotor 9. Force tending to deflect the rotor 9 parallel to the axis 4 is thus reduced, which reduces the strength requirement of the rotor support structure in order to permit a relatively small generator magnetic gap.

The rotor 9 is connected to the mounting arrangements 8 and maintains the angular relationships of the mounting arrangements. In particular, the rotor 9 resists the torque about the axis 4 generated by the weight of the mounting arrangements 8 and the blades 7 so as to maintain the relative angular spacings thereof. The connections of the mounting arrangements 8 to the bearing members 6 are not required to maintain these angular relationships or spacings and may even comprise pivotal connections as mentioned hereinbefore.

The torque generated by the blades 7 is communicated substantially exclusively via the connection 20 to the generator rotor 9. In particular, there is substantially no communication or transmission of torque to the rotor 9 via a path comprising the members 11 and 12, the bearing members 6 and the members 15 and 16. The members 15 and 16 supporting the rotor 9 on the bearing member 6 carry reduced load or component of force parallel to the axis 4 and so are merely required to ensure structural stability of the rotor 9 in directions parallel to the axis 4 in the presence of such reduced load. All of the load-bearing members are acting in substantially tension or compression and thus resemble a space frame arrangement. An open framework structure resembling or acting as a space frame may therefore be used to form the turbine rotor arrangement for mounting the turbine blades and driving the generator. A relatively light structure may therefore be provided and is easily capable of maintaining structural integrity in the presence of forces occurring during the operation of a relatively high power wind turbine. For example, such a structure may be used to provide a relatively light 12 MW or similar size generator.

Because the torque generated by the blades 7 about the axis 4 is communicated substantially exclusively by the connection 20 on each member 8, the connection 20 may be of a pivotal type. Similarly, the connections 21 of the members 11 and 12 to the bearing members 6 are not required to communicate or resist torque because the rigid substantially straight members 11 and 12 are substantially only transmitting tension and compression forces along their lengths. Reduced forces in the plane of FIG. 2 parallel to the axis 4 act on the rotor 9 so that the air gap between the annular permanent magnet carrying members 17 and 18 may be relatively small.

In the case of a wind turbine with a maximum generating capacity of the order of 12 MW, the blades 7 are typically of the order of 50 m in length and the rotor 9 is typically of the order of 12 m radius. The open frame structure provides adequate structural integrity by means of a relatively light structure forming or resembling a space frame. Manufacture of components, transportation to site, and assembly of the components to form the wind turbine are therefore easier and cheaper than for known types of arrangements. It is therefore possible to provide a wind turbine which is less expensive to manufacture and assemble and which requires relatively little servicing in use. Such a wind turbine therefore provides a very good ratio of generated energy to total cost throughout its lifetime and represents a sustainable source of electrical energy which is very efficient in terms of manufacturing and running costs.

By providing the permanent magnets of the generator on the rotor 9 and the coils 19 of the generator on the stator 10, the generated electricity may be extracted from the wind turbine by means of fixed electrical conductors without requiring, for example, slip-rings or other relatively moveable electrical connections. However, if necessary or desirable, the permanent magnets may be provided on the stator 10 and the coils may be provided on the rotor 9, in which case some form of rotating electrical connection, such as sliprings, will generally be necessary in order to extract the generated electricity from the wind turbine.

The generator rotor 9 forms part of the structure of the wind turbine rotor. It therefore serves the dual purpose of mounting the permanent magnets (or coils) of the generator and forming part of the structure for transmitting the torque generated by the blades 7. This represents a structurally efficient arrangement which contributes to the relative lightness of the turbine rotor and generator assembly.

Figure 3:
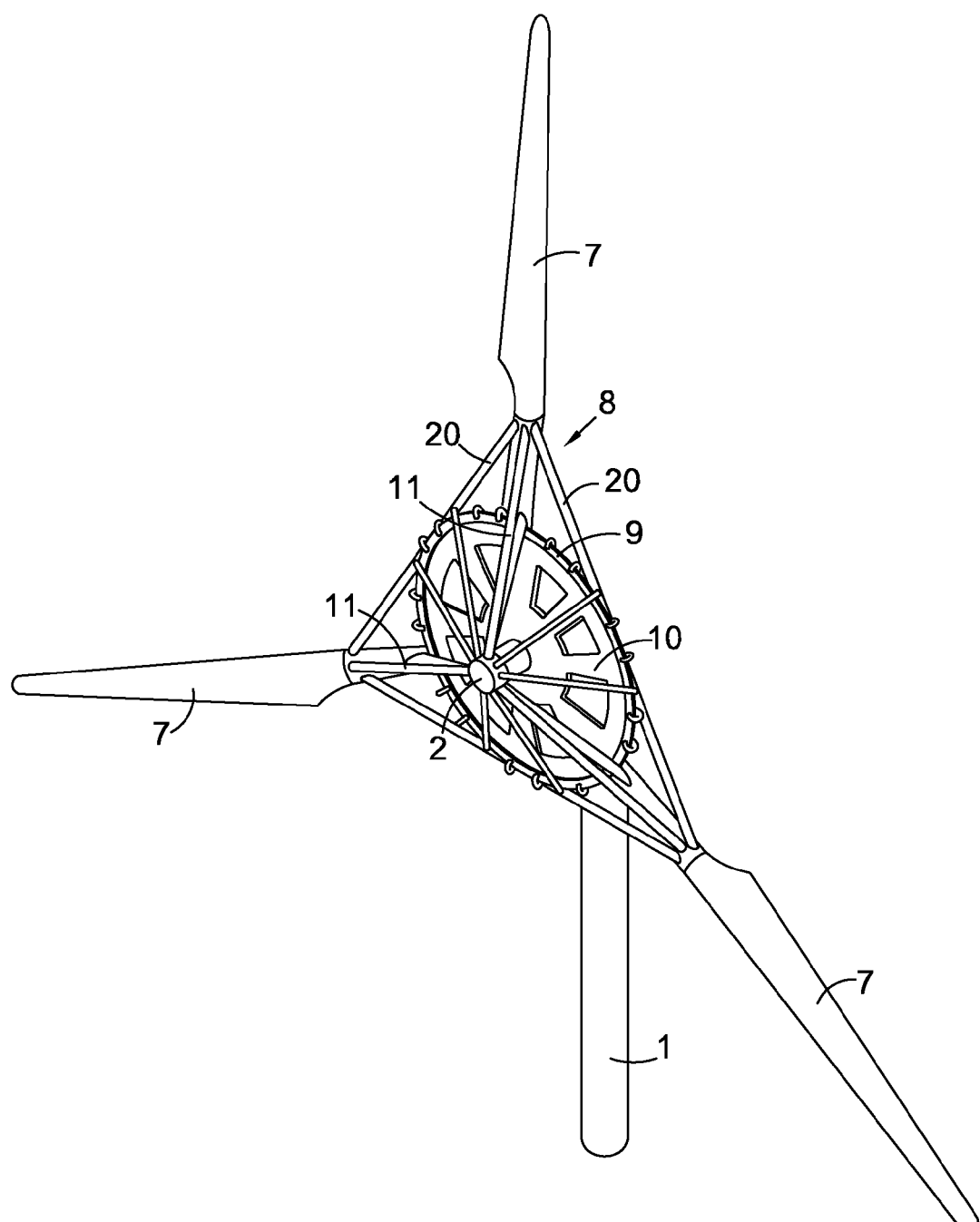
FIG. 3 illustrates a wind turbine constituting another embodiment of the invention.
Figure 4:
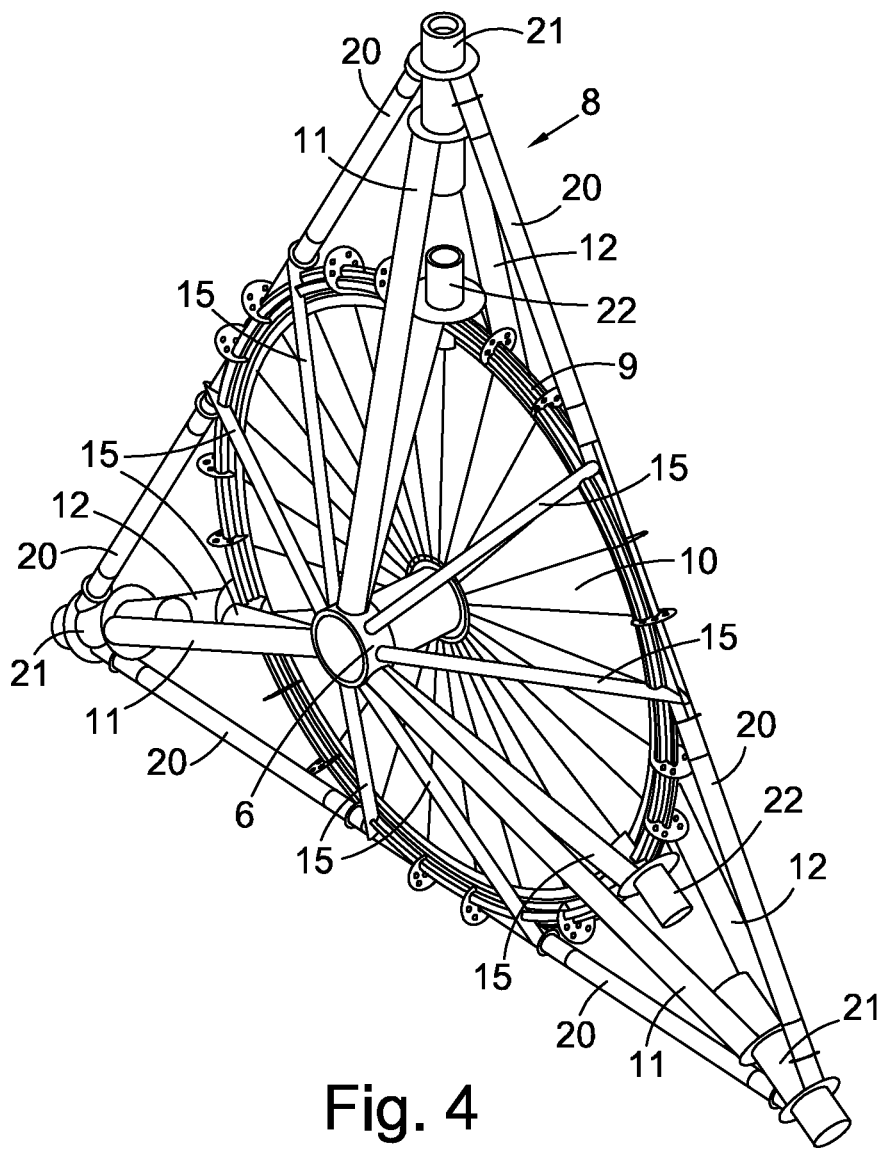
FIG. 4 illustrates a wind turbine rotor and stator of the turbine of FIG. 3 in more detail.

FIGS. 3 and 4 illustrate another type of wind turbine rotor which differs from that shown in FIGS. 1 and 2 principally in that the members 11 and 12 are formed as rods or tubes, for example of metal. Also, the connections 20 for transmitting torque from the blades 7 to the rotor 9 are formed as rods or tubes so that the structure including the blade mounting arrangements 8 more closely resembles a space frame. Each blade has its inward end mounted in a main bearing 21 such that at least some of the resultant force of components of forces acting on the blades parallel to the axis 4 of the shaft 2 is communicated to the bearing members 6 via the members 11 and 12 (the members extend in lines which substantially intersect each other at or adjacent the centre of force of the blade for all force components acting parallel to the axis of rotation) whereas torque acting on the blades 7 about the axis 4 is communicated substantially exclusively by the members 20 to the rotor 9 and the rotor 9 maintains the angular relationship of the mounting arrangements 8. The innermost ends of the blades are provided with or formed into a shaft which passes through the main bearings 21 to further bearings 22 which are fixed to the outer ends of those members 15 and 16 (not visible in FIGS. 3 and 4) which are located in the same radial plane containing the adjacent members 11 and 12. The members 15 and 16 therefore assist in communicating components, parallel to the axis 4, of force acting on the blades 7 to the bearing members 6 and do not transmit any substantial torque about the axis 4. The blades 7 and the rotor 9 are thus connected together and to the bearing members 6 by a space frame or an arrangement resembling a space frame. The rotor 9 also serves the purposes of acting as a structural member in respect of torque, resisting blade forces perpendicular to the axis of rotation, and supporting the permanent magnets (or coils) of the generators. The stator 10 is fixed to the shaft 2 between the bearing members 6, which form part of or are provided with thrust bearings for fixing or limiting the axial separation of the bearing members 6.

Figure 5:
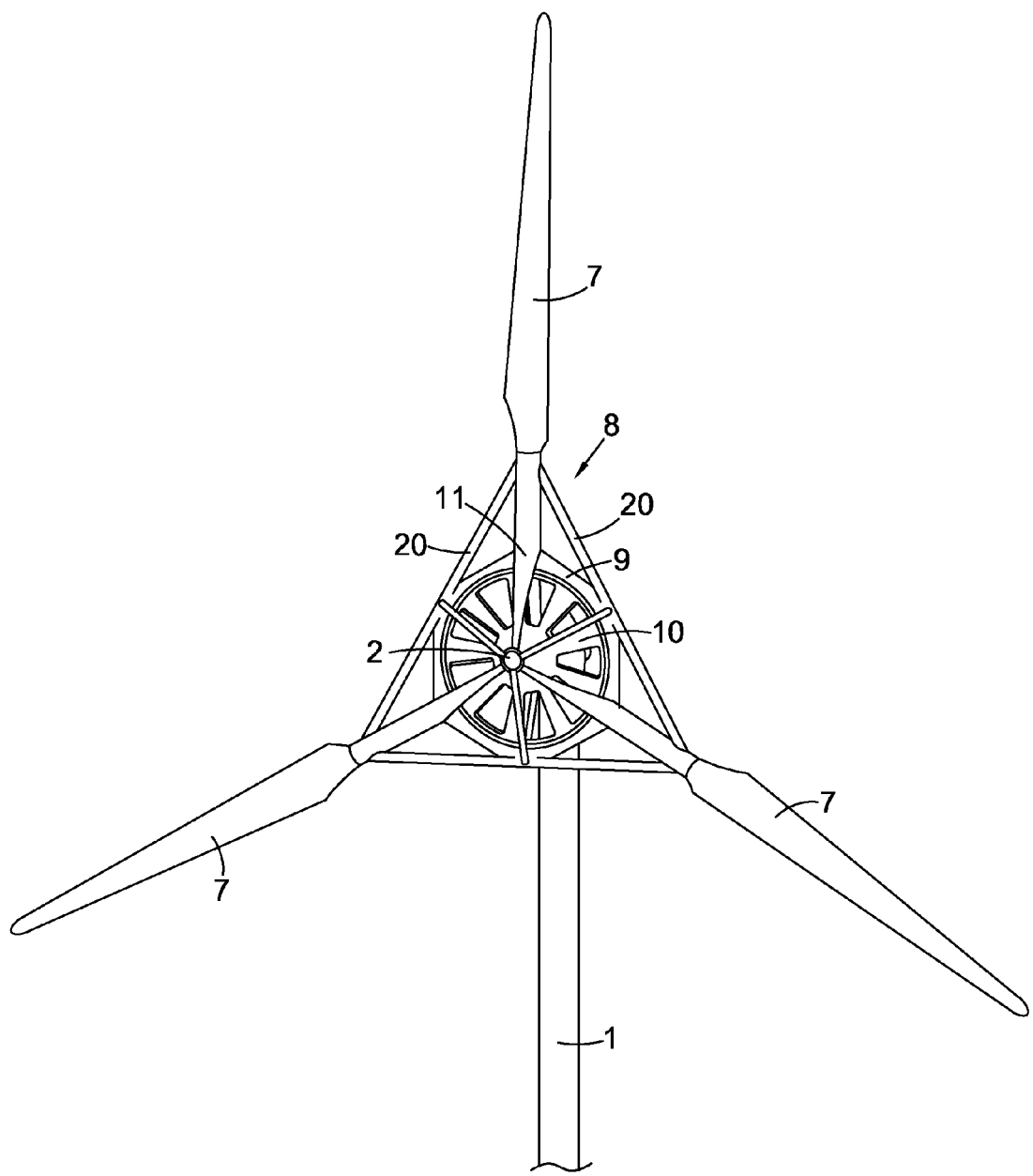
FIG. 5 illustrates a wind turbine constituting a further embodiment of the invention.
Figure 6:
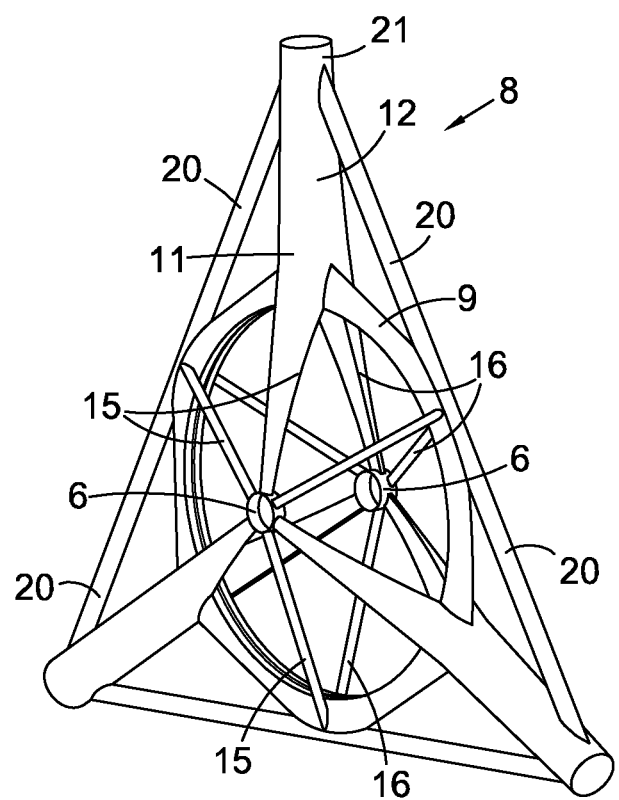
FIG. 6 illustrates a wind turbine rotor of the wind turbine of FIG. 5 in more detail.

The wind turbine rotor shown in FIG. 6 of the wind turbine shown in FIG. 5 is similar to the wind turbine rotor shown in FIG. 4 but is arranged to be fabricated as composite material sections which are bonded together. Each member 11 or 12 and its adjacent member 15 or 16 is formed integrally with the main blade bearing 21 and the auxiliary blade bearing 22. The whole of the wind turbine rotor may be formed of bonded composite components or may include some non-composite components. This rotor may therefore be considered as a composite equivalent of a space frame.

Figure 7:
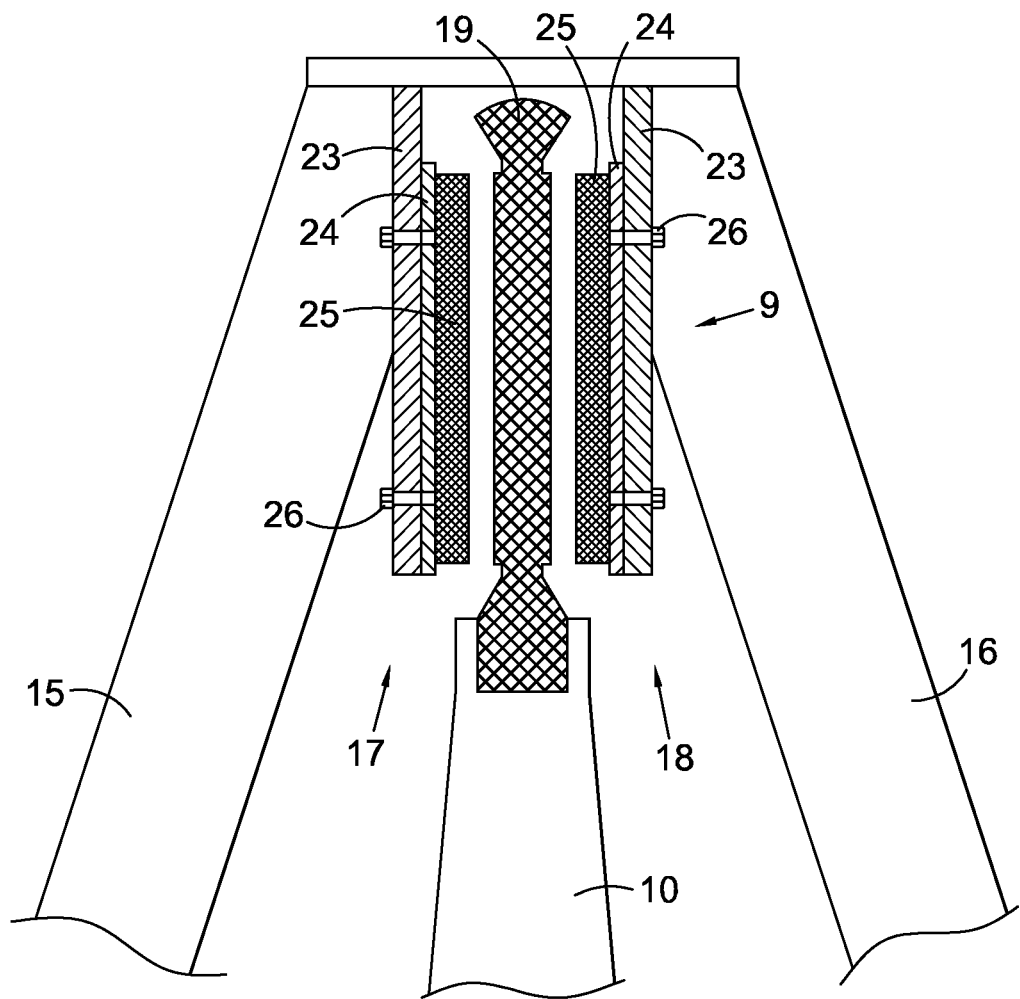
FIG. 7 is a cross-sectional drawing of a detail of the wind turbine part shown in FIG. 2.

FIG. 7 illustrates part of the generator rotor and stator structure which may be used in any of the embodiments but which, by way of example, relates to the rotor shown in FIG. 2. The generator rotor 9 comprises first and second annular yokes 23, which form a major structural part of the generator rotor. The yokes 23 also provide a magnetic flux path and therefore must be of a sufficient thickness for this purpose and of a suitable ferromagnetic material. The yokes 23 are fixed to the radially outer ends of the members 15 and 16.

In this embodiment, the permanent magnets 25 are fixed to the rotor 9. In particular, each of the permanent magnets 25 is of sector-like shape and is fixed to a ferromagnetic mounting plate 24. The mounting plates 24 are detachably fixed to the yokes 23, for example by means of bolts 26, so as to allow the magnets to be assembled to and dissembled from the yokes 23.

The stator 10 comprises a plurality of coils 19, for example "potted" in an epoxy resin so as to maintain the shape and structure of the coils against the forces acting within the generator and without the need for cores or formers. The coils 19 are disposed in the magnetic air gap defined between facing magnets 25 on the first and second yokes 23. The magnetic field in the air gap is substantially uniform so that generator performance is tolerant of the axial position of the coils 19 relative to the magnets 25. The magnets of each facing pair defining the air gap have opposite magnetic poles facing each other. Also, the magnetic poles of the permanent magnets on the yokes alternate circumferentially (or angularly about the axis 4). Each of the coils 19 thus generates an alternating current and the coils may be interconnected in accordance with any suitable, for example known, technique in order to provide the desired power output.

Advantage is taken of the need for the magnetic flux path behind the generally flat magnets to be of a certain minimum thickness for optimal generator performance. Much of this thickness is provided by the yokes 23, which are therefore relatively strong and form part of the structure of the generator rotor for the transmission of torque. Using separate mounting plates 24 for mounting the magnets 25 is convenient for the fabrication of the generator rotor 9 and for servicing, such as removal and replacement of damaged magnets.

Splitting of the generator rotor 9 into continuous annular yokes 23, which may be welded and/or machined prior to mounting of the magnets, and a plurality of discrete segments in the form of the plates 24 carrying the magnets 25 allows the magnets to be mounted during assembly of the rotor in smaller groups or segments. This is again convenient for assembly and for removal during use to replace damaged magnets or for any other purpose. Such an arrangement allows the mounting plates 24 and magnets 25 to be installed radially from outside the generator rotor structure without interfering with the end windings of the coils 19 which, as shown in FIG. 7, tend to be wider than the parts of the coils passing through the magnetic air gap. The stator 10 with the coils 19 is formed as a plurality of generally sector-shaped elements which are also installed radially during assembly of the turbine rotor. Each stator element is installed simultaneously with the adjacent magnets 25 on their mounting plates 24 so as to accommodate all of the components at the generator rim. This allows the main generator rim structure formed by the annular yokes 23 to be continuous.

Figure 8:
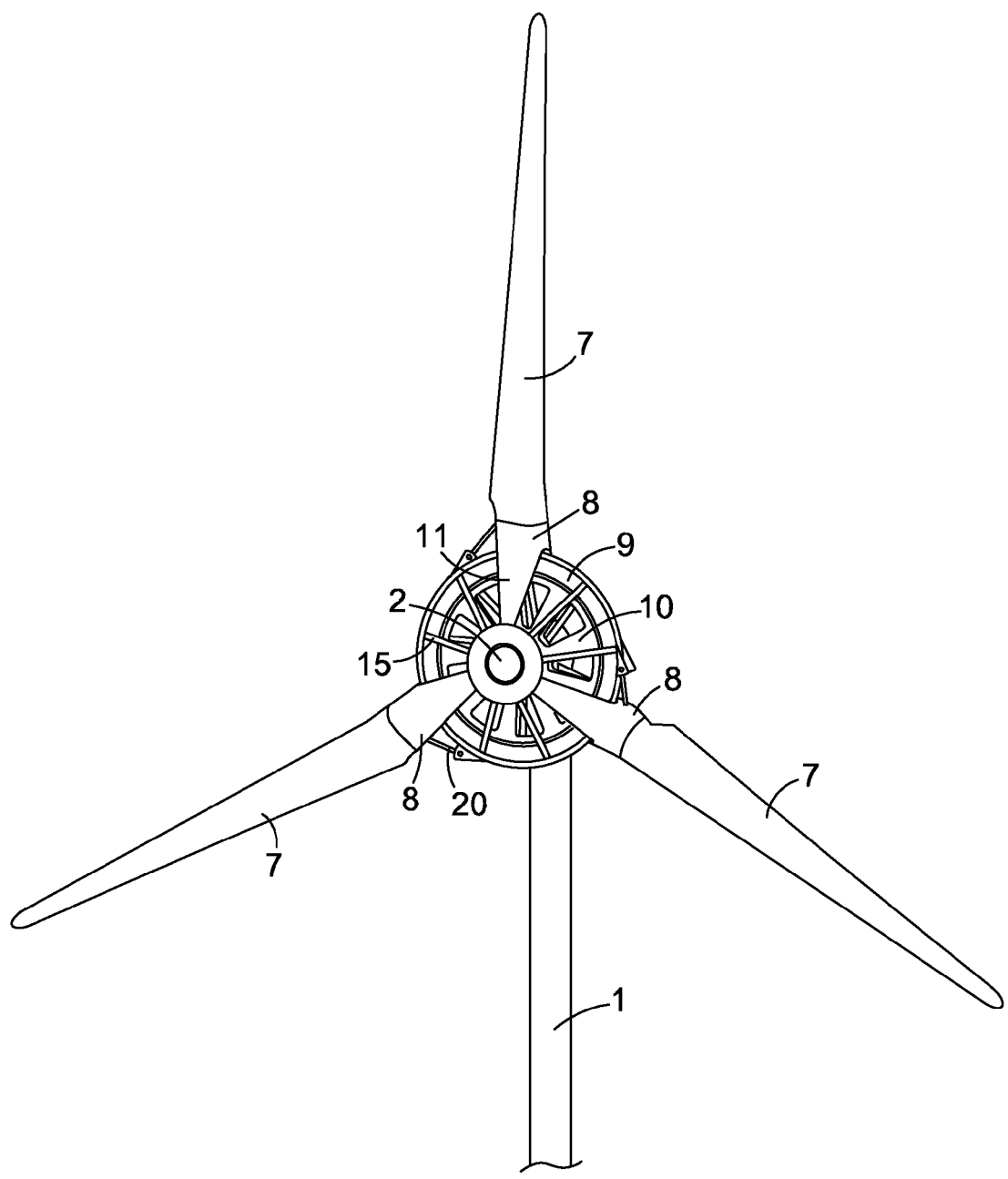
FIG. 8 illustrates a wind turbine comprising yet another embodiment of the invention.

FIG. 8 illustrates a wind turbine which differs from that shown in FIG. 1 in that the connection 20 is in the form of a link instead of an extended tail of the blade mount. Also, the pitch bearing is radially nearer the shaft 2. Further, the pinned connection 21 is replaced by a different connection of any suitable type.

It should be appreciated that the blades 7 do not have to of adjustable pitch, and the blades 7 also do not have to separately formed from the blade mounting arrangements 8.

In variable pitch arrangements, the blades of the wind turbine are collectively or individually controlled so as to change their angle to the apparent wind and hence control the speed of the rotor. Although such arrangements work well, they require the blades to be rotatably mounted about their longitudinal or "pitch" axes. Actuators, such as electric motors, are required to vary the blade pitch and control arrangements are required to control the blade pitch. This adds to the cost and complexity of such wind turbines and may add to the servicing requirement.

The wind turbine may have a stall controlled speed control speed control arrangement. In the case of stall control or regulation, the blades are not rotatable about their pitch axis but are fixed to the hub with their twist distributed to operate at near optimal rotational velocity to inflow speed (tip speed ratio). At velocity relationships above optimal, the angle of attack is reduced and the torque produced is reduced. At velocity relationships below optimal, the angle of attack is increased, causing the blade to stall, reducing torque-producing lift, and increasing drag. Part of this regulation mechanism may depend on the capability to control the rotor rotational velocity, either by provision of reactive torque from the generator or by mechanical or aero braking systems. Such may therefore be provided as necessary or desirable.

A result of the stall control approach may be that higher loads are imposed on the rotor and turbine system compared with a pitch controlled turbine. However, the system simplicity and greater system reliability of stall regulation make it economically attractive in many applications.

In some embodiments the blades 7 may be integrally formed with the blade mounting arrangements 8, for example using the composite materials mentioned above. It is also possible for the whole blade rotor, including all of the blades 7, to be integrally formed, for example if the whole rotor is formed of composite components as mentioned above.

The invention claimed is:

1. A wind turbine comprising
a shaft;
a plurality of blade arrangements, each of which is rotatable around the shaft and has a blade;
at least first and second bearing arrangements spaced axially along the shaft; and
a direct drive generator comprising a stator, which is rotationally fixed to the shaft, and a generator rotor having a rim connected to the first and second bearing arrangements,
each of the first and second bearing arrangements transmitting radial forces from the generator rotor to the shaft and at least one of the first and second bearing arrangements separately transmitting bending moments to the shaft,
each of the blade arrangements being connected to a point at or adjacent the rim so as to transmit torque generated by the blade arrangement directly to the rim, and
each of the blade arrangements having first and second legs which straddle the generator.

2. A wind turbine as claimed in claim 1, in which the stator is disposed between the first and second bearing arrangements.

3. A wind turbine as claimed in claim 1, in which each blade is connected to the rest of the blade arrangement by a pitch bearing.

4. A wind turbine as claimed in claim 1, in which the rim is connected to the first and second bearing arrangement by a plurality of pairs of third and fourth legs, respectively, with the third and fourth legs of each pair being disposed in a plane containing or parallel to the axis of the shaft.

5. A wind turbine as claimed in claim 1, in which each of the blade arrangements is connected to the point by a link which is flexible and/or pivoted to the blade arrangement and/or the point.

6. A wind turbine as claimed in claim 1, in which each of the first and second bearing arrangements transmits bending moments to the shaft.

7. A wind turbine as claimed in claim 1, in which the first and second legs are connected to the first and second bearing arrangements, respectively.

8. A wind turbine as claimed in claim 1, the generator rotor at least partially maintaining the angular relationships of the blade arrangements and being separate from the blade arrangements, each blade arrangement being arranged to communicate torque from the blade arrangement acting about the shaft substantially exclusively to the generator rotor.

9. A wind turbine as claimed in claim 1, in which the blade arrangements have blades which are unsupported at their radially outer ends.

10. A wind turbine as claimed in claim 1, in which the or each bearing arrangement comprises a plurality of plane or rolling element bearings whose outer races are rigidly connected to a pipe.

11. A wind turbine as claimed in claim 1, wherein each blade has a centre of force for all force components acting parallel to said shaft, and said first and second legs extend in lines which substantially intersect each other at or adjacent said centre of force.

12. A wind turbine as claimed in claim 1, wherein said blade arrangements and blades form a blade rotor which is separate from said generator rotor.

13. A wind turbine as claimed in claim 12, wherein said generator rotor is within said blade rotor.

14. A wind turbine as claimed in claim 1, wherein said first and second legs have radially outer ends which are connected together at an outer part of the blade arrangement which provides a mounting for said blade.

15. A wind turbine as claimed in claim 14, wherein said mounting for said blade allows the blade to be pivoted about its longitudinal axis so as to permit the pitch of the blade to be controlled.

16. A wind turbine as claimed in claim 1, in which each blade arrangement is connected to the generator rotor by a first member for transmitting torque about the shaft from the blade arrangement to the generator rotor and, in which the first member is resilient, and/or is articulated to the blade mounting arrangement and the generator rotor, so as to reduce or prevent the communication of components, acting parallel to the axis, of all forces acting on the blade arrangement to the generator rotor.

17. A wind turbine as claimed in claim 16, in which each first member is connected to a plate which is disposed between the blade and the rest of the blade arrangement and to which the blade is attached.

18. A wind turbine as claimed in claim 17, in which each blade is mounted to the plate via a pitch bearing.

19. A wind turbine as claimed in claim 1, in which each blade arrangement comprises second and third members disposed in a second plane containing the shaft and having first ends connected together and to the blade and second ends connected to the at least one bearing member at respective positions which are spaced apart parallel to the shaft.

20. A wind turbine as claimed in claim 19, in which each blade has a centre of force for all force components acting parallel to the shaft and the second and third members extend in lines which substantially intersect each other at or adjacent the centre of force.

* * * * *